INVENTORS
WOLFGANG L. ABEL
RICHARD K. HAAS

BY *Toulmin & Toulmin*
ATTORNEYS

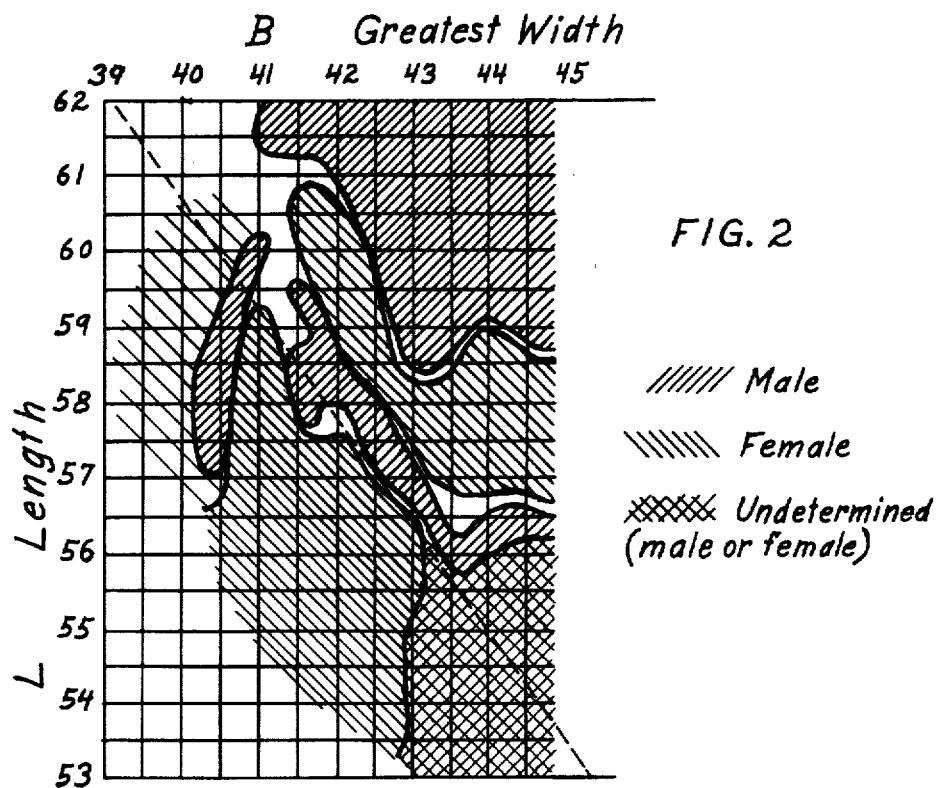

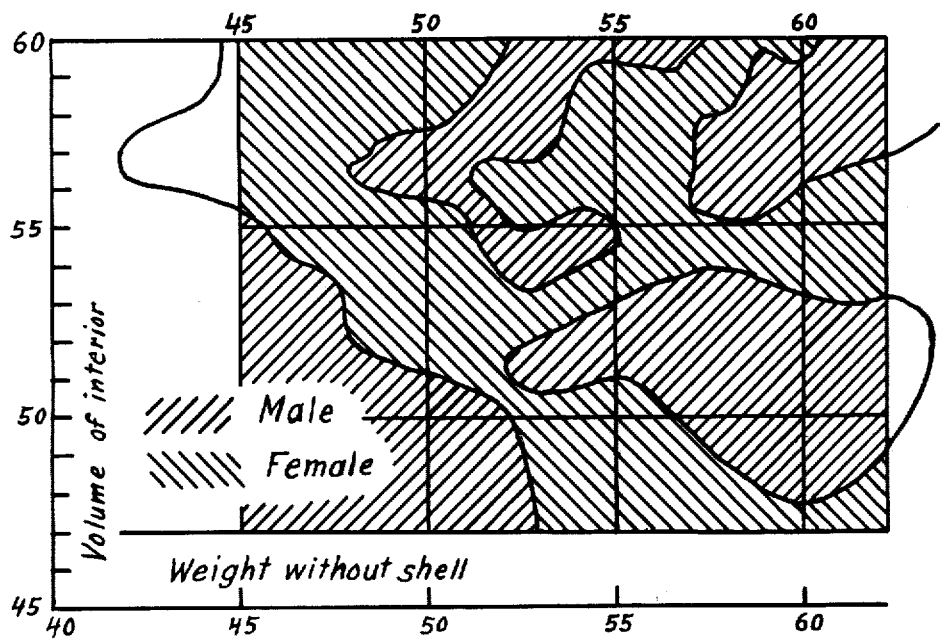
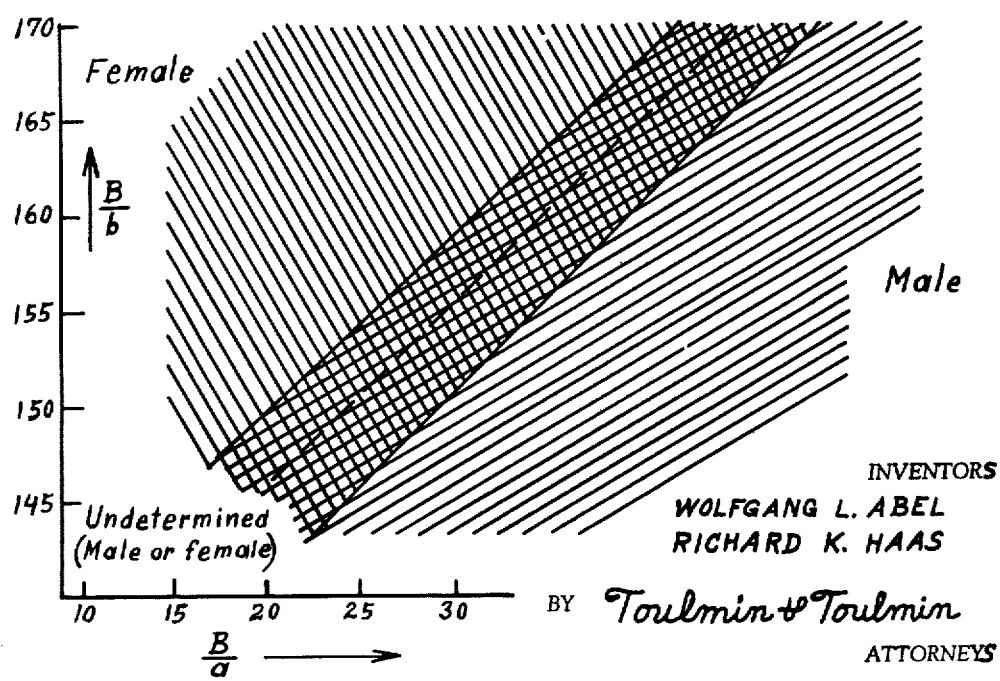

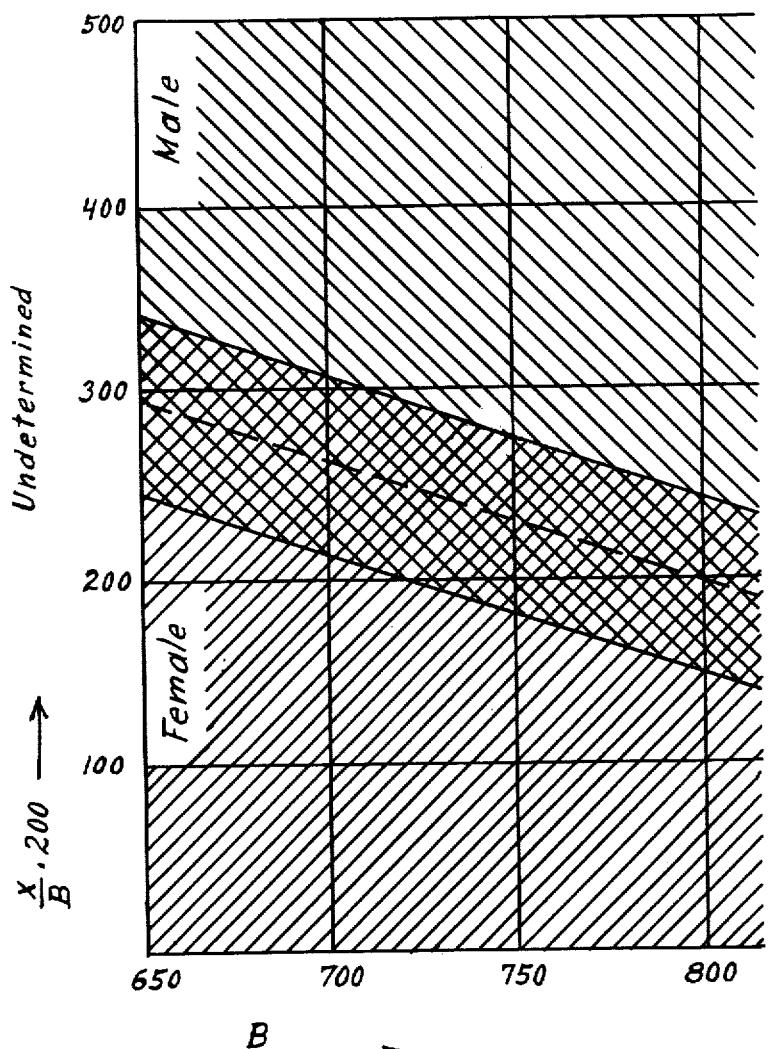

INVENTORS
WOLFGANG L. ABEL
RICHARD K. HAAS

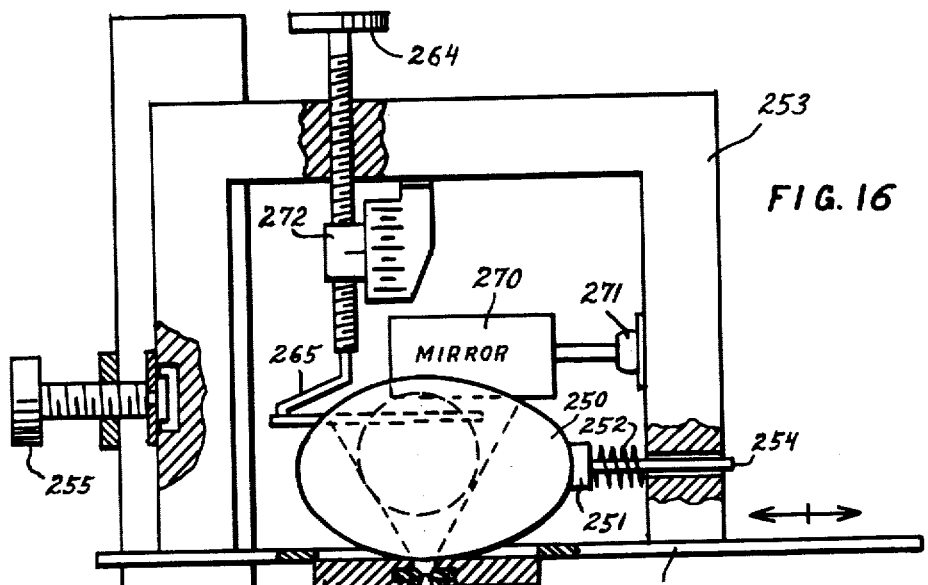
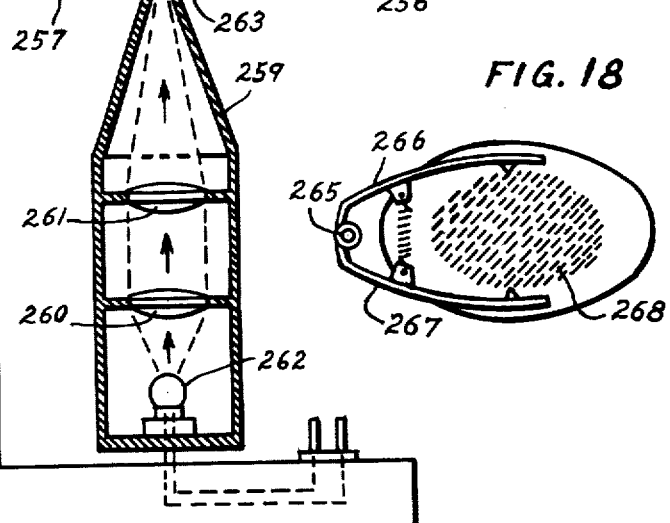
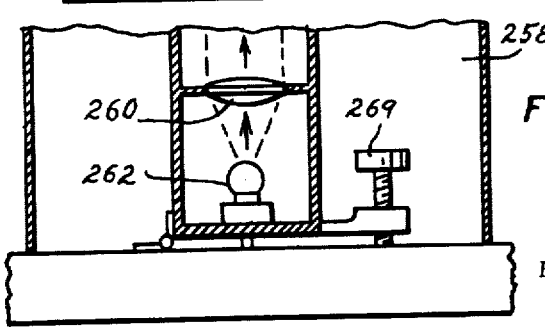

April 30, 1963     W. L. ABEL ETAL     3,087,614
METHOD FOR TESTING AND SORTING EGGS
Filed Sept. 18, 1956     10 Sheets-Sheet 9
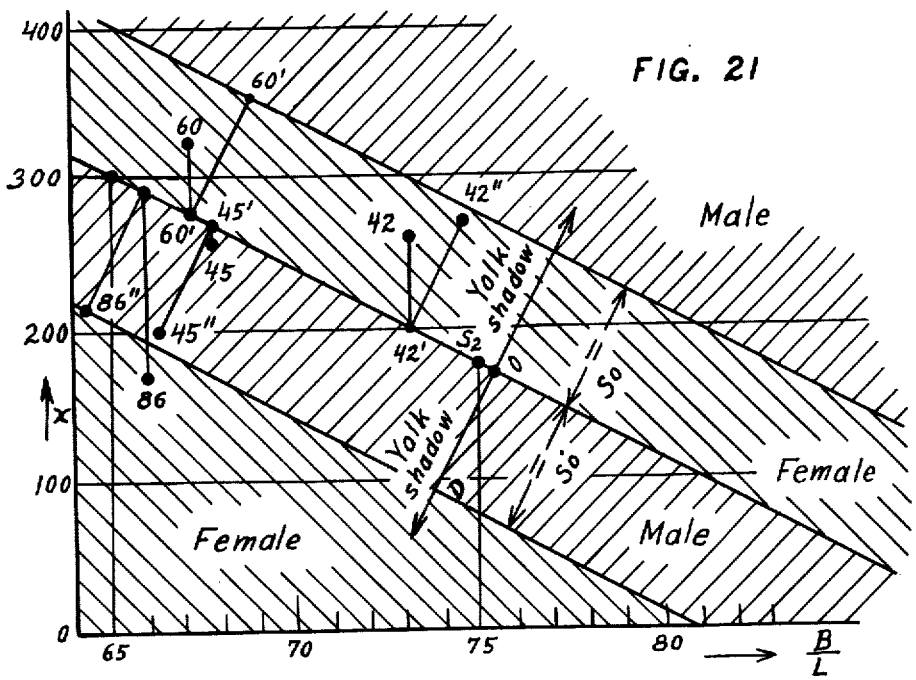
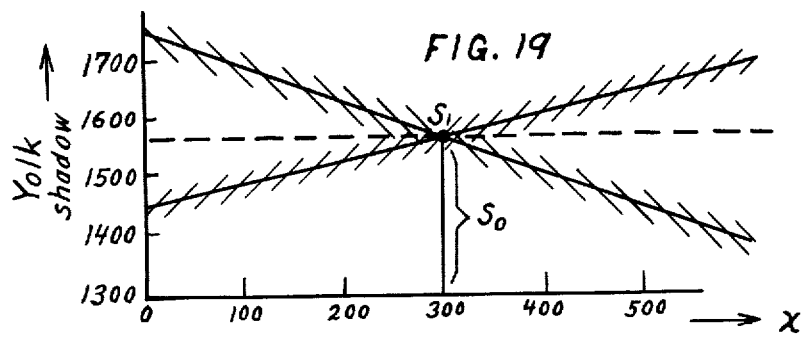
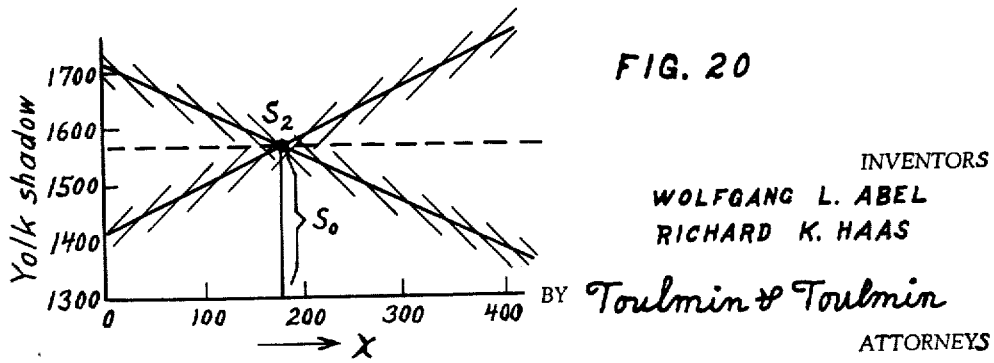
INVENTORS
WOLFGANG L. ABEL
RICHARD K. HAAS
BY Toulmin & Toulmin
ATTORNEYS United States Patent Office 3,087,614
Patented Apr. 30, 1963

1

3,087,614
METHOD FOR TESTING AND SORTING EGGS
Wolfgang L. Abel and Richard K. Haas, Salzburg, Austria, assignors to Ova Colombo Gesellschaft m.b.H., Salzburg, Austria
Filed Sept. 18, 1956, Ser. No. 610,601
5 Claims. (Cl. 209—122)

This invention relates to a method of testing and sorting a collection of akin bird's eggs for a latent feature. More in particular, this invention relates to a method of testing and sorting fresh eggs of birds according to the sex or other latent features of the egg. This invention is a continuation-in-part of our patent application Ser. No. 514,072, filed June 8, 1955, now abandoned.

The invention relates to a method which is particularly suitable for testing eggs to be hatched. It resides in determining at least two determinants of each egg to be tested, such as, for instance, the weight, specific gravity, volume, large and small diameters, or other features which can be measured. The measured values thereof are graphically coordinated, either directly or after a functional conversion of characteristics of the egg. Thereafter the location of the coordinates of the respective egg inside or outside of coordinate ranges which have been determined for the same determinants by statistical methods as being characteristic of the occurrence of the features concerned is used as a criterion indicating how far the features in question do actually exist in the egg or in the embryo of the egg if a viable embryo is found in the individual egg.

FIGURE 2 is a graphical illustration indicating the male spaces and the female spaces functionally determined by the length of the egg and the greatest width of the egg.

FIGURE 4 is a graphical illustration indicating the male spaces and the female spaces functionally determined by the volume and the specific weight of the interior of the egg.

FIGURE 9 is a graphical illustration indicating the male spaces and the female spaces functionally determined by the length and the greatest width of the egg and factor $x$.

FIGURE 10 is a graphical illustration indicating the male spaces and the female spaces functionally determined by the ratio of the greatest width to the length of the egg and a function of factor $x$.

2 curve obtained from measuring the inertial mass of the egg.

Figure 15:
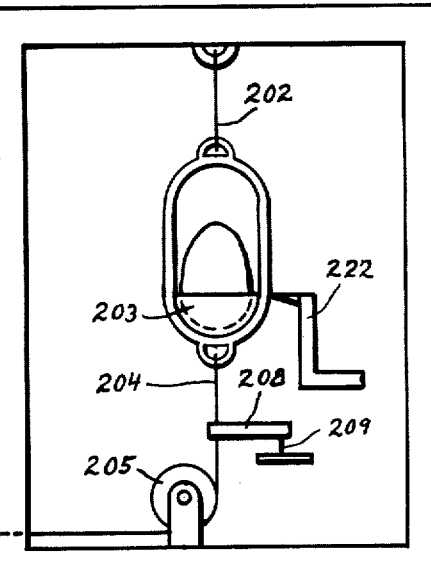

FIGURE 15 is an illustration of an apparatus for a measuring the inertia of the egg.

FIGURE 16 is a cross-sectional front view of an apparatus for measuring the height of the yolk shadow of the egg.

FIGURE 17 is a detailed view of the lower part of the casing with the light source and adjusting screw of the apparatus shown in FIGURE 16.

FIGURE 18 is a detailed view of the indicating needle of the apparatus shown in FIGURE 16.

FIGURE 19 is a graphical illustration of the functional relation between the height of the yolk shadow and the factor $x$ for male and female eggs.

FIGURE 20 is a graphical illustration similar to FIG. 19, but based on measurements of another egg.

FIGURE 21 is a graphical illustration of the functional relation between height of the yolk shadow, factor $x$, and the ratio of the greatest width to the length for male and female eggs.

Figure 22:
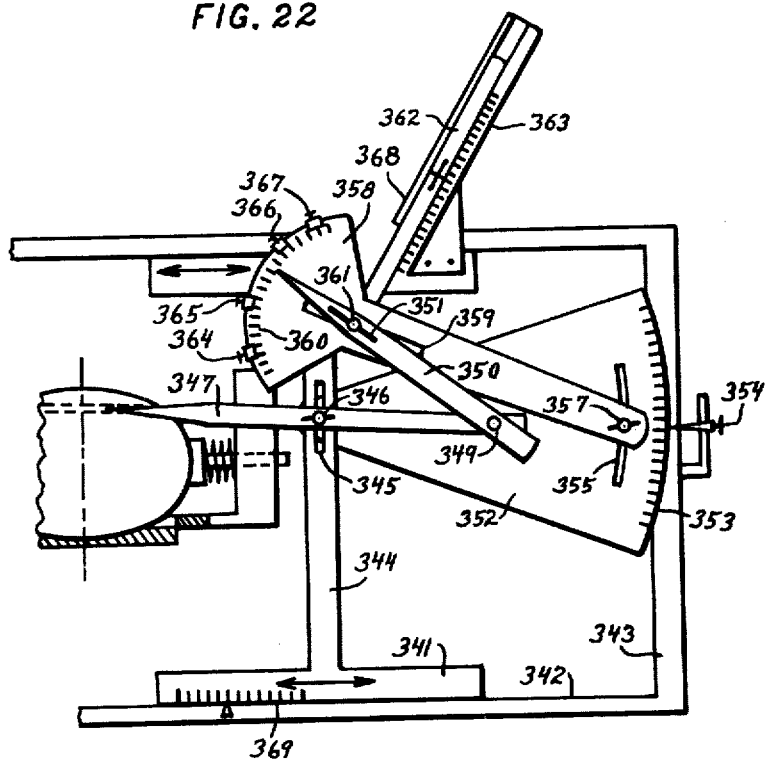

FIGURE 22 is a front view, partly in section of an apparatus for correcting the measured value of the height of the yolk shadow of the egg.

According to a first embodiment of the method of the present invention, the length of the egg and its greatest width are used as two determinant factors.

Figure 1:
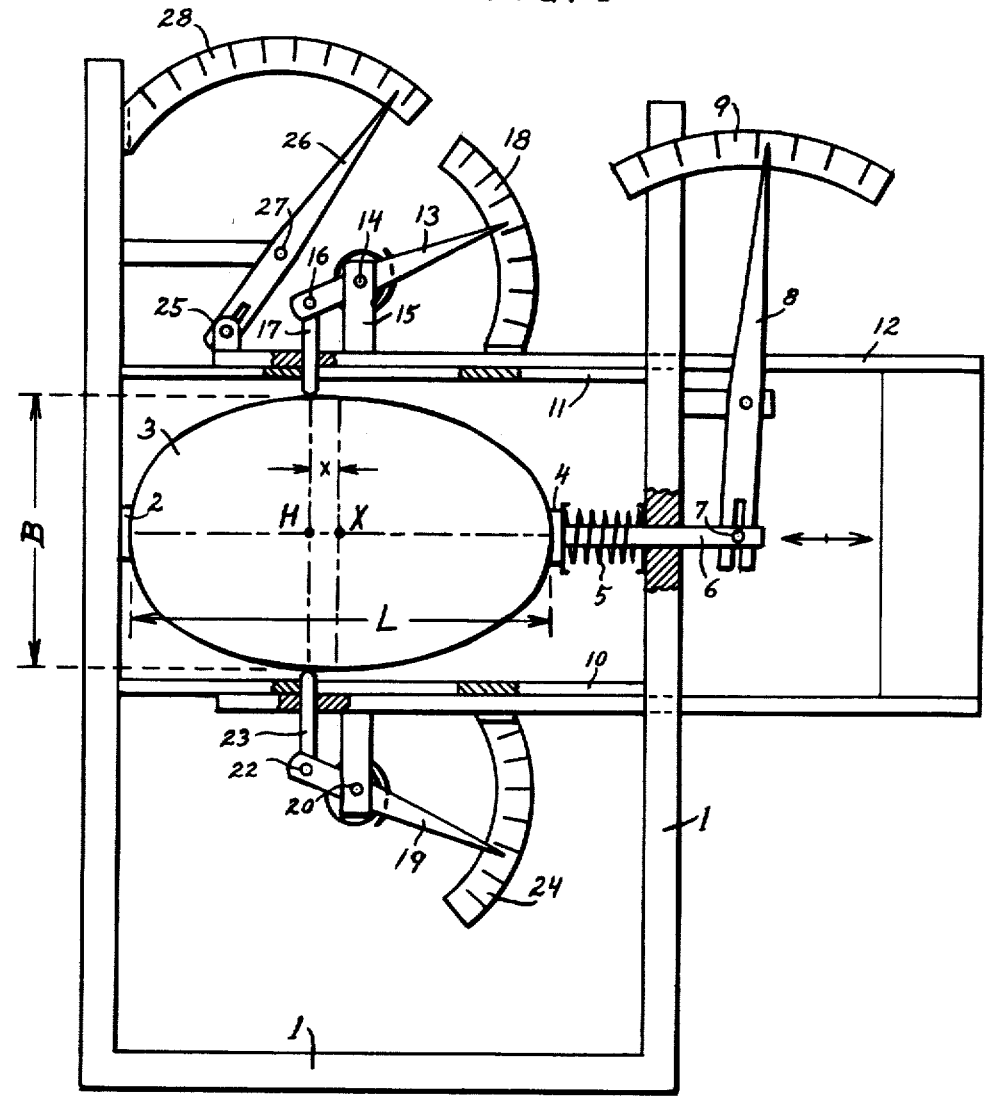
FIGURE 1 is a cross sectional front view of an apparatus for measuring the length, the greatest width and the factor $x$ of the egg.

The length of the egg as well as its greatest width can be measured very accurately and in a simple manner by the following apparatus shown in FIGURE 1:

A rectangular U-shaped frame 1 is provided with a first cheek 2 fixedly mounted on the inner side of the left vertical wall of the U-shaped frame. The egg 3 to be measured is pressed against cheek 2 by a second cheek 4 influenced by pressure spring 5 mounted on rod 6. The end of rod 6 opposed to cheek 4 protrudes from the outer side of the right-hand vertical wall of frame 1 in FIGURE 1. The end of rod 6 protruding from the frame is provided with a pivot pin 7 upon which is fitted the indicating needle 8. This needle indicates the length of the egg on scale 9 mounted on frame 1.

The vertical side walls of frame 1 are connected by two parallel rails 10 and 11. Upon these two rails a rectangular, U-shaped sliding frame 12 can be moved along in either longitudinal direction, and parallel to the longitudinal axis of the egg. This sliding frame 12 bears on its top part above the egg a first indicating needle 13 mounted upon axis 14 which in turn is fastened to the post 15 vertically mounted upon slide 12. The needle 13 bears at its end opposed to the tip a pivot 16 onto which is fastened the feel pin 17. The sliding frame 12 bears at its lower end identical indicating and feel means consisting of indicating needle 19, axis 20, pivot 22, feel pin 23, and scale 24. On scales 18 and 24 the greatest width B of the egg is indicated by indicating needles 13 and 19 respectively. By moving the sliding frame 12 along the slide rails 10 and 11 in longitudinal direction of the longitudinal axis of the egg, the point of the greatest width of the egg is found and indicated on scales 18 and 24 respectively.

The results obtained by measuring the lengths and the greatest widths of the eggs by the apparatus just described are compile into a table and appear in FIGURE 2 where the values representing the various lengths of the individual eggs are entered on ordinates, and the values representing the widths on the abscissa. The function position of each egg in the coordinate system is thus fixed by its length and width. As can be seen from FIGURE 2 there are male spaces, female spaces, and undetermined, intermediary spaces. The characteristic of an egg is thus determined by the location of its function value in the coordinate system of FIG. 2.

Frequently, eggs have to be tested which were laid by birds but which have been subjected to varying feeding conditions, i.e., they have been fed not the same kind but different types of food over a prolonged period of time, e.g. fresh vegetables, salad, corn or corn products, animal substances, and the like. Since in that case the size, shape and consistency of the egg shell are comparatively unpredictable and non-uniform, more accurate results are obtained by employing as two determinants the specific weight and the volume of the interior of the egg (yolk plus egg white).

The special problem of this method of testing resides in the fact that volume and specific weight of the egg short of the egg shell have to be ascertained, while, at the same time, the egg shell cannot be removed from the egg but has to remain undamaged to permit of hatching.

Two means for determining the weight of the shell according to the invention will be described hereinafter.

The first means suggested for determining the weight of the shell resides in a method in which the moment of inertia of the egg is measured for its long diameter in such a manner as to avoid relatively large angles of rotation, and that moment of inertia is evaluated in accordance with the relation between the moment of inertia, large and small diameters and weight of the shell. Devices known for other purposes can be used for measuring the moment of inertia; in such measurement relatively large angles of rotation are to be avoided to minimize the disturbing effect of the elastic bond between the egg-shell and the contents of the egg. The relation between the said four values can be determined empirically and can be represented, e.g., by graphic methods. The results of measurement can be evaluated with reference to such showing.

According to a second method of the invention the problem is solved by determining this specific weight of the egg-shell through a computation based upon its elasticity. The elasticity is, in turn, found by a pressure test applied to the shell, carried out by means of an apparatus to be presently described.

Figure 3:
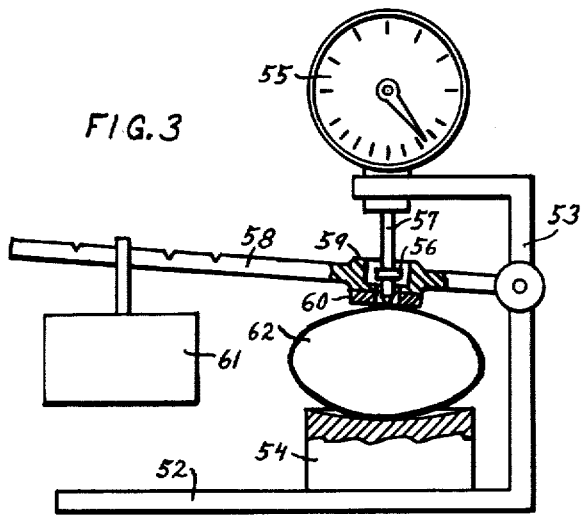
FIGURE 3 illustrates an apparatus for determining the weight of egg shells.

In the illustrative embodiment of such device shown in FIG. 3, a baseplate 52 has affixed thereto a strong bracket 53 and an engaging jaw 54 serving for supporting the egg. The stirrup 53 carries a precision measuring instrument 55, which has a feeler 57 extending in the direction towards the jaw 54 and provided with a collar 56. Further, the bracket 53 carries a pivoted lever 58, which comprises the pressure jaw 59. The latter is formed with wide bore which is inwardly stepped at its lower end. The feeler 57 extends through that bore. The lever 58 has connected thereto at the lower end of said bore an annular pressure plate 60 of resilient material. A weight 61 is placed on the lever 58.

The lever 58 is lifted and the egg 62, whose shell weight is to be determined, is placed on the engaging jaw 54. Owing to the re-entrant shoulder of the pressure jaw 59 the feeler 57 is lifted too. Now the lever 58 is lowered until the point of the feeler 57 contacts the egg and the collar 56 does no longer rest on the shoulder of the pressure jaw 59. Then the reading of the measuring instrument 55 is taken. The lever 58 is lowered farther until the pressure plate 60 engages the egg 62; then the lever is released. The previous reading is subtracted from the value now read from the measuring instrument 55; the difference of the two readings indicates the reduction of the compressed diameter. Using the interrelations which have once been found empirically, it is possible to determine the shell weight from that reduction and the dimensions of the egg. The pressure plate 60 serves to enable the force to be applied as uniformly as possible.

Finally it is conceivable to take two measurements by applying forces successively to each of the two diameters of the egg and jointly evaluating the resulting deformations. In this way the influence of an uneven thickness of the shell on the result of the measurement is reduced or practically eliminated.

Also the influence of the weight of the shell on the test result can be eliminated without requiring the weight of the shell to be determined. To this end the following procedure may be adopted, for instance:

The measured determinants of the egg are the weight and a parameter related to the specific gravity, e.g. the residual weight after complete immersion in water. Then the eggs are subjected to ageing for a predetermined time, in which their weight and specific gravity are reduced. Thereafter the said determinants are measured again for all eggs and the difference is obtained for the two measurements before and after ageing. For instance the weight measured after the ageing is deducted from that measured before the ageing. These difference values are considered characteristics of the egg and co-ordinated as described hereinbefore. The resulting characteristics express the changes in weight and specific gravity in dependence on time. In this modification of the method, the age of the eggs may be considered a third characteristic. By the determination of the difference the weight of the shell, which is not altered by the ageing, is eliminated so that it need not be taken into account.

The measurement of the specific weight of the egg without its shell will be better understood by the following example.

The entire egg including its shell is weighed, and a total weight of 58.40 grams is found. The elasticity thickness of the egg is found by measuring pressure exerted upon the egg. In the pressure producing apparatus described above, the egg is subjected to a pressure of 3.5 kgs. Under this pressure the shell of the egg recedes on both sides and by a total amount of 0.244 mm. An egg having the identical receding value is destroyed and the fragments of the shell are weighed. As a result it will be found that the weight of the shell expressed in grams corresponds to the reciprocal receding value of the egg expressed in mm. Deviations do not exceed 40%. In the present example the equation applies $$\frac{1}{0.244} = 4.1 \text{ mm.}^{-1}$$

On the basis of the empirically discovered equation the weight of the shell is found to be 4.1 grams. As the weight of the total egg is 58.40 grams the weight of the egg without its shell 58.40−4.10=54.30.

The volume of the egg without its shell is found by first measuring the total volume of the egg. The egg is immersed into water and found to be heavier than the displaced water by an amount of 4.73 grams. Its total volume is therefore 58.40−4.73=53.67 cm.$^3$.

It is assumed that the average specific weight of the shell is 2. The total volume of the shell is therefore obtained by dividing the weight of the shell (4.10 grams) by the specific weight: 4.10÷2=2.05 cm.$^3$. Consequently the volume of the egg without its shell amounts to: 53.67−2.05=51.62 cm.$^3$.

The specific weight of the interior of the egg without its shell is computed by dividing the weight of the egg without its shell by the volume of the egg without its shell: 54.30÷51.62=1.050 gr./cm.$^3$.

The results entered in the coordinate system shown in FIGURE 4 of the drawings wherein the volume of the interior of the egg has been entered on the ordinate and the specific weight has been entered on the abscissa, again clearly show a definite separation of female and male spaces.

Figure 5:
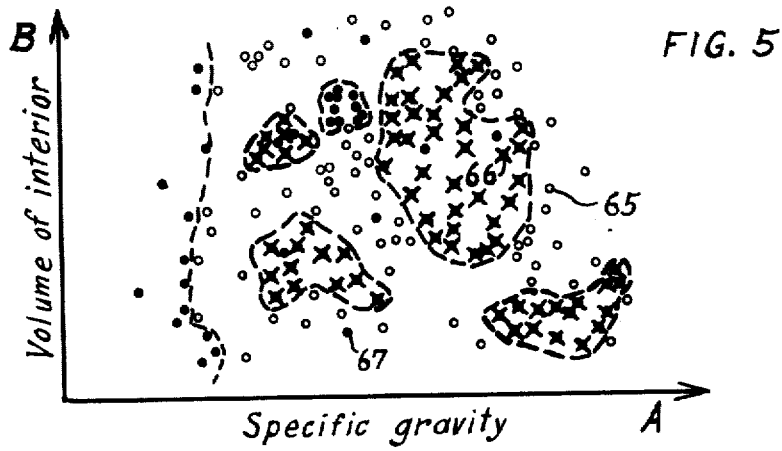
FIGURE 5 is a graphical illustration of the determination of coordinate ranges representative of certain latent features.
Figure 6:
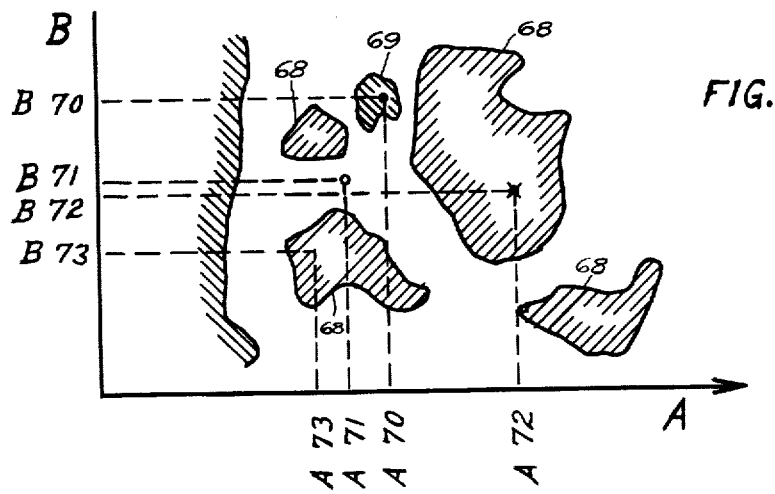
FIGURE 6 is a graphical illustration showing how the method of the invention is carried out using the coordinate ranges known from FIGURE 5.

The distribution of these values for a large number of eggs tested according to the two determinants of specific weight and volume is also illustrated in FIGURES 5 and 6 of the drawings.

On FIGURE 5, for each egg there has been entered on a graph that point which is determined by its characteristics, in the present case by the values of the specific gravity A of the egg, shown as abscissa and the volume B of the interior of the egg shown as the ordinate. The mark used for characterizing each egg is a ring 65 if the chick crept out is female, and a cross 66, if it is male, or a dot 67 if the egg did not give a creeping chick at all or one which was not viable. Upon closer consideration it will be seen that there are ranges comprising only or preponderately eggs of one of said groups; these ranges can be limited from each other by drawing parting lines. The ranges thus marked out constitute the desired coordinate ranges and form the basis for carrying out the method of our invention with the aid of the determinants selected.

To give a basic explanation of the procedure the following description thereof will be based on the assumption that the evaluation of the measurements taken of the eggs to be tested is also made with reference to a graphical showing of the coordinate ranges. Such a showing is given in FIGURE 6. The coordinate ranges of eggs whose chicks will probably be male according to the preliminary investigation described with reference to FIGURE 5 are designated by 68 and the ranges of embryos or chicks which will probably be dead or will not creep are designated with 69. The intermediate range of female chicks is not marked out.

Now the specific gravity A and the volume B of the interior of the egg are determined also for the eggs to be tested, e.g. for the eggs 70, 71, 72, 73 and are considered directly as characteristics of the eggs concerned. Then the points A70/B70, A71/B71, etc. are determined on the axes A and B to locate the eggs 70, 71 etc. relative to the coordinate ranges 68 and 69. In the present case the characteristics of the egg 70 lie in one of the dead ranges 69, those of the egg 71 in the female range and those of eggs 72 and 73 in male ranges 68. This result determines the group in which the respective eggs are to be sorted.

Figure 7:
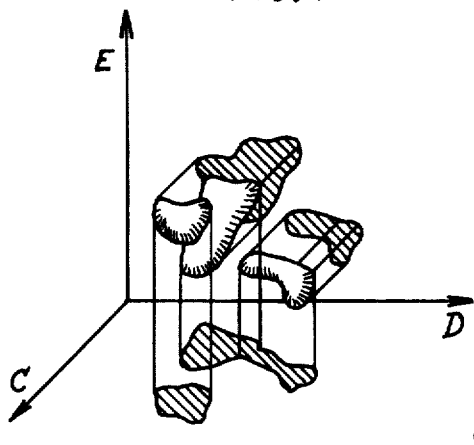
FIGURE 7 is a perspective view of three-dimensional coordinate ranges.

Whereas valuable results are obtained already by the coordination of only two characteristics, corresponding to a two-dimensional projection of the facts to be indicated, the use of, e.g., one additional determinant may be required in certain cases. In such case the representative coordinate ranges are three-dimensional. FIGURE 7 is a diagrammatic illustration of a system of coordinates for three determinants C, D and E, with three three-dimensional coordinate ranges obtained similarly as described hereinbefore.

Figure 8:
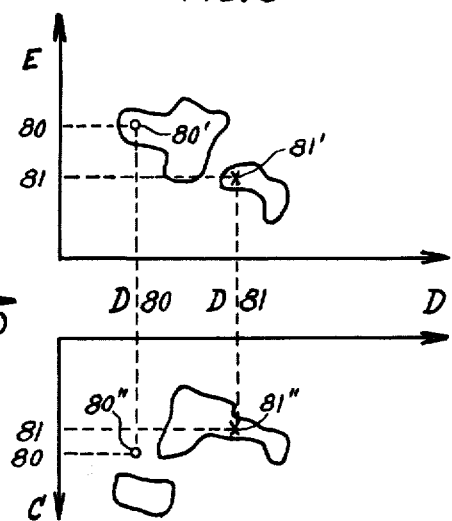
FIGURE 8 shows two-dimensional projections of the coordinate ranges of FIGURE 7.

An attempt to represent these three coordinate ranges, assumed by way of example, in a single two-dimensional showing, e.g. by a projection on the plane C—D or D—E, must fail in the present case, as is indicated by the thin contours of FIGURE 7 and the corresponding showing of FIGURE 8. The projection gives a partial overlap so that only two closed ranges are obtained in the C—D plane as well as in the D—E plane. This shows that none of the two showings of FIGURE 8 will clearly describe the ranges actually existing according to FIGURE 7. For instance, in the upper half of FIGURE 8 the characteristics D80/E80, D81/E81 of two eggs 80, 81 to be tested are entered in the upper half of FIGURE 8 as points 80′, 81′ which lie within the contours of the three-dimensional coordinate ranges of FIGURE 7 projected on the D—E plane. This would suggest that the respective coordinate points of the two eggs lie actually within the three-dimensional coordinate ranges. If the third characteristic C is now considered too, projection of the contour lines upon the C—D plane, it will be seen that the point 81″ determined by the characteristics C81/D81 does lie within said contours, whereas the point 80″ determined by the characteristics C80″/D80″ does not. For this reason the point 80 will certainly lie outside the three-dimensional coordinate ranges given.

By introducing a third determinant in the manner just outlined, the results obtained will be rendered even more accurate. A third determinant may consist of the factor $x$, representing the distance between the center of the longitudinal axis and the crossing point of the axis across the greatest width of the egg with the longitudinal axis.

The center of the egg is determined by one half of the length of the egg, $$\frac{L}{2}$$

The diameter of greatest width which crosses the length determining axis perpendicularly does not generally coincide with the diameter which crosses the middle point of said axis. The distance $x$ between these two crossing points varies with the consistency of the egg. This distance $x$ can be used as a third determinant. However, it can be reduced to the two basic determinants of length and greatest width of the egg.

The component $x$ can be introduced as a third determinant in two different ways. One coordinate may be expressed as $$\frac{B}{\frac{L}{2}+x}$$

and the second coordinate may be expressed as $$\frac{B}{\frac{L}{2}-x}$$

or, one coordinate may be expressed as $$\frac{x \cdot C}{B}$$

and the second coordinate as $$\frac{B}{L}$$

C being a constant which may, for instance, assume a numerical value of 200.

The factor $x$ can be measured by the apparatus shown in FIGURE 1 of the drawings, which has already been partly described further above in connection with the measurement of the length and width of the egg. In order to allow for a measurement of the factor $x$ this apparatus must further comprise the following features:

At the left of the upper rail of the sliding carriage 12 on a pivot 25 is mounted an indicating needle 26 fulcrumed at point 27. This needle 26 indicates on scale 28 the point of the greatest width of the egg. The scale 28 thus indicates $a$ as $$\left(\frac{L}{2}+x\right)$$

or $b$ as $$\left(\frac{L}{2}-x\right)$$

and from this value of $a$ or $b$ respectively, $x$ can be easily found. In the accompanying drawings the tip of the egg points to the right and therefore $b$ is measured. If the tip of the egg points to the left $a$ is measured as indicated on scale 28.

The first alternative is illustrated by way of an example in FIGURE 9 of the drawings for a group of eggs produced by a particular stock of hens having been subjected to uniform feeding conditions. As will be seen from FIG. 9 the male and female spaces respectively are delineated and limited by straight lines. In the upper part, above the upper straight line female chickens will be obtained from hatching the eggs in this space at a rate of probability of 87%, while the probability for the male space below the lower straight line is 85%. The space lying between the two straight lines determines a 50% probability of eggs developing into male or female chickens. If a center line is drawn between the two straight lines—shown by the dotted line in FIGURE 9 of the drawings—a rate of probability for each sex of 73% prevails in the upper or lower space respectively. Thus, the rate of probability for any one of either sexes being found in the upper or lower space respectively increases in direct proportion to the distance of the delineated line of the dotted center line.

The second alternative, according to which one coordinate is the ratio of B/L and the second coordinate assumes the value of $$\frac{200x}{B}$$

is shown in FIGURE 10 of the drawings.

Again the female and male spaces respectively are limited by a straight line. The female space above the upper straight line has a rate of probability of 92%, and the male space below the lower straight line has equally a rate of probability of 92%. The center space delineated by the upper and lower straight line contains eggs developing into chickens the sex of which cannot be prognosticated. If a center line is drawn—as represented by the dotted line in FIGURE 10 of the drawings—the rate of probability in the two spaces is only 71% for either sex.

As a third determinant the frictional resistance of the yolk of the egg relative to the egg white can be employed. This factor can be ascertained by fastening the egg to a tensioned torsional wire and revolving the same in order to cause a vibration of the egg.

The tension of the wire must be in a proper relation to the width of the individual egg tested. The vibrations are transmitted to an indicating needle arranged on the tensioned wire. This needle can be electrically caused to mark a continuously advanced strip of paper. The vibrations offer a basis for obtaining the relative size of the yolk and the egg white as well as the viscosity of the egg white.

The eggs with female characteristics show a shorter duration of vibration and are more asymmetrical.

A small amount of viscosity of the various components of the egg white favors undampened vibrations (see FIGURE 11 of the drawings) because the initial vibration produced by the tensioned wire and to be imparted to the egg is not very readily transmitted to the yolk if the viscosity is small.

The viscosity of the interior of the egg can be determined from the oscillation curve of the egg which has been made to oscillate or vibrate, since, when the vibration is strong, the yolk vibrates from the start, which is not the case when the vibration is but slight. This is evident from FIGS. 11-14.

Figure 11:
FIGURE 11 is a graphical illustration of a curve obtained from measuring the inertial mass of the egg.

According to FIG. 11, there is a moderate, even vibration which is extended particularly to the egg shell with the egg white directly underneath it, whereas the yolk is in the position of rest since the viscosity is small.

Figure 12:
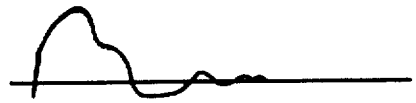
FIGURE 12 is another graphical illustration of another curve obtained from measuring the inertial mass of the egg.

FIG. 12 shows an apparent adhesive association of the yolk with the shell due to an increased viscosity of the egg white with the egg shell in such a manner that the first curve of the vibration is still very marked, whereas the second one is braked by the yolk being made to co-vibrate. The third vibration is only slight due to the braking of the yolk.

Figure 13:
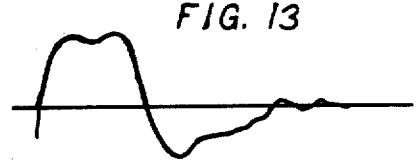
FIGURE 13 is another graphical illustration of another curve obtained from measuring the inertial mass of the egg.

FIG. 13 shows an even stronger adhesion of the yolk with the egg shell, in that the second yolk vibration is brought into almost the same level as the first vibration.

Figure 14:
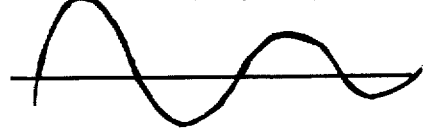
FIGURE 14 is another graphical illustration of another

FIG. 14 shows a still further solidification of the yolk with the shell by means of an increase of the viscosity of the egg white, so that the whole egg vibrates with its content similar to a solid body.

In addition, the frictional resistances depend upon the shape of the egg, i.e., a long egg having a small width will permit of a better transmission of the friction of the yolk, while an egg approaching a ball shape is not conducive to a perfect transmission of the resistance. For this reason the index of length and width of the egg must be chosen as a second determinant, and the factor $x$ as a third determinant, since the ratio $L/B$ as well as factor $x$ are a function of the viscosity of the yolk of the egg on the one hand and of the egg white on the other hand.

The shape of the yolk of a comparatively short egg approximates the shape of a ball, and the yolk of an extremely elongated egg approximates the form of an ellipse. These differences in the shape of the yolk of the egg also depend upon the viscosity. Therefore the ratio L to B as well as the factor $x$ must be considered.

Instead of imparting a vibration to the egg through a tensioned wire and measuring the damping effect exercised by the yoke in the egg it is also possible to revolve the egg, stop the revolving movement and measure the rotary energy stored in the egg. This can be done by placing the egg in a cup mounted upon a shaft positioned in precision bearings. By varying the duration of the stopping operation the amount of the egg white resting against the shell, as well as the size of the yolk can be measured. The measurement after stopping can be effected by a disc applied to the shaft at the moment of the stopping process, and acting against a certain frictional or other resistance.

The inertia of the yolk relative to the egg white can also be ascertained by oscillating the egg in a horizontal instead of a vertical position of its longitudinal axis.

The inertial masses of the various component parts of the interior of the egg can be measured by means of the following apparatus:

According to one form this measuring device, shown in FIG. 15, a wire or thread 202 is suspended from a rectangular frame. This wire holds an egg-cup 203 at the bottom end of which another wire or thread 204 is attached. This second wire or thread is guided over pulleys 205 and 206 and charged at its lower end by a weight 207, tensioning the wires or threads 202 and 204. An indicating needle 208 is fastened to the wire or thread 204, the tip 209 of which contacts a recording element disposed parallel to needle 208, and below and in contact with the tip 209.

The egg to be tested is placed into the cup 203 and the indicating needle is swung around its axis, for instance by 180° thereby twisting the tensioned threads or wires 202 and 204. The indicating needle is then released and the egg-cup 203 together with the egg swings back. If the tip 209 is colored or the recording element is covered with a soft layer as for instance soot, the swinging movements are recorded by the needle.

The curves registered by the needle vary according to the inertial masses of the individual components of the egg, as for instance the egg white and the yolk.

As a third determinant, and in addition to the width of the egg, one can introduce as a factor the height of the yolk shadow, which is a function of the size of the yolk. The height and the size of the yoke shadow is measured at the point of the greatest width above the central plane of the longitudinal axis of the egg. It is also possible to measure the distance of the shadow from the highest point of the egg. The height of the yolk shadow varies according to the round or elliptic shape of the yolk, which shape in turn depends on the viscosity of the egg white on the one hand and of the yolk on the other hand. These relations of viscosity or osmosis between the yolk and the egg white are also related to the external shape of the egg.

The height of the yolk shadow can be measured by the apparatus, shown in FIGURES 16 to 18 of the drawings, making use of optical means first developed by Käsemann.

The egg 250 is pressed by a first cheek 251 influenced by a pressure spring 252 pressing with its other end against top frame 253. The cheek 251 and the spring 252 are mounted upon a rod 254 inserted in the movable rectangular top frame 253. This top frame can be displaced by adjusting screw 255 along table 256, thus moving the egg in longitudinal direction of this table. The table 256 is interrupted directly below the egg and the egg itself rests upon the screening cloth 257. Underneath the interruption of the table and directly below the egg and engaging the screening cloth there is mounted a rectangular casing 258 with a tapering top part 259. Within this casing there is arranged a condensing lens system consisting of a first convex lens 260 and a second convex lens 261. Below this lens system there is arranged a light source 262. At the top of part 259 of the casing there is mounted a light filter 263 compensating for the color of the yolk shadow so as to obtain a uniformly dark shadow produced by the yolk under the influence of the light rays emitted from the light source 262 through the lenses 260, 261 and the filter 263. As the color of the yolk varies, the color of the filter must vary accordingly, i.e. if the yolk is yellow the filter must be green and if the yolk assumes a lightly yellow color the filter must be made of a more bluish color. By turning the adjusting screw 255 the egg can be moved along the table 256 and thus be displaced relative to the light source until the latter is located exactly below the point of the greatest width of the egg. On the upper part of top frame 253 there is mounted a measuring screw 264 which can be adjusted so that the pivoted branches 266 and 267 of the indicating needle 265 are positioned to delimit the height of the yolk shadow 268. The indicating needle 265 may be of any desired construction.

The casing 258 can be adjusted in vertical direction relative to the longitudinal axis of the egg 250 by adjusting screw 269 so as to attain the full and undistorted size of the yolk shadow.

A mirror 270 is movably mounted in the top frame 253 by a ball joint 271 behind the egg 250. Thus the entire area of the yolk shadow can be perceived. The position of the deepest point of the yolk shadow is indicated on a nonius 272.

In measuring the height of the yolk shadow it should be kept in mind that the temperature of the egg must at all times be kept constant. This temperature must be as elevated as possible and at the same time biologically unharmful. The most suitable temperature is the temperature at which the eggs are hatched. At lower temperatures, the viscosity of the egg white would be too great and as a consequence the yolk could not be made to to rise within the egg up to a point directly below and as close as possible to the upper portion of the shell.

It has already been mentioned that in measuring the height of the yolk shadow the ratio of the greatest width to the length and the factor $x$ must be introduced in order to eliminate the above mentioned functions between the size of the yolk and the egg white as well as its shape.

The male and the female yolks respectively have peculiar shapes varying from one another, although there are seasonal variations, too. The male yolk is more in the way of a ball shape, whereas the female yolk has a more prolonged shape. The difference between the shape of the male and female yolks increases together with the size of the yolk relative to the size of the egg.

Since the measured size of the yolk shadow depends upon the size of the diameter of the yolk, a correction must be made in order to obtain the correct size of the yolk. The correcting factor is obtained from the relations of the greatest width and length of the egg and the position of the greatest diameter of the egg ($x$).

If a number of eggs of substantially the same age and having the identical ratio of width and length $B/L$ are measured with regard to factor $x$ and the size of the yolk shadow, it will be found that the eggs having male yolk shadow, it will be found that the eggs having male characteristics are located on an oblique straight line and the eggs having female characteristics are located on another oblique straight line crossing the first line (see FIGURE 19 of the drawings). The crossing point $S_1$ of the two lines is situated at a distance $S_0$ from the abscissa, and this point $S_0$ signifies a certain point of the yolk shadow. A straight line through the crossing point S, at the distance $S_0$ from the abscissa represents the boundary line separating the male from the female spaces.

By the same procedure the crossing point $S_2$ for eggs having another ratio ($B/L$) is found (see FIGURE 20 of the drawings).

If the values thus found are entered into a coordinate system having on its first coordinate $B/L$ and as a second coordinate the distant $x$, the diagram of FIGURE 21 of the drawings is obtained. In this diagram the main line of reversal is determined by the values $S_1$ and $S_2$ found in the diagrams of FIGURES 19 and 20. Parallel to the central line and at a distance $S_0$ above and below the latter, respectively, there are the outer boundary lines separating the males and females.

For the determination of the sex of a particular egg, the ratio of the greatest width and length ($B/L$) as well as the distance $x$ and the size of the yolk shadow S is necessary. The values thus found are entered into the diagram of FIGURE 21, and the point in the coordinate system is projected to the central line. From this projected point the measured size of the yolk shadow is entered vertically upon the central line upon a line located on the same side of the central line as the crossing point of $x$ and $B/L$. If the terminal point of this line is located in the male space, the particular egg has male characteristics and if the terminal point of this line is located in the female space the particular egg has female characteristics several examples of which are found in FIG. 21.

The pre-selection of the eggs according to two determinants can be made by means of the apparatus shown in FIGURE 1 of the drawings and described in detail above, or the measured values $B/L$, $x$ can be fed directly into a correction device, such as is shown in FIG. 22.

A sliding carriage 341 in FIG. 22 is mounted on sliding rails 342 of the frame 343 and can be slidingly displaced in longitudinal direction of the egg placed into the apparatus in a manner described further below. Upon this sliding carriage 341 there is mounted a column 344 having in its upper part a slot 345. The axis 346 of an indicating needle 347 rests within this slot and can be moved up and down within the same. The axis 346 can also be arrested within the slot 345 by means of a wing nut. At the end opposed to the tip of the indicating needle 347 another indicating needle 350 is hingeably attached at point 349 to the needle 347. The needle 350 is provided with a guide slot 351.

A segment 352 is mounted upon the axis 346 having a scale 353 opposed to a third indicating needle 354 mounted upon frame 343. The segment 352 has an arc shaped guiding slot 355. In this slot 355 the axis 357 of a second segment 358 can be arrested by means of a wing nut 356. The segment 358 bears a guiding slot 359 and a scale 360 cooperating with the indicating needle 350. The two guiding slots 351 and 359 are connected to each other by a pivot bolt 361 to which an indicating bar 362 is pivotally connected and slidable along the rail 368 for cooperation with the fixed scale 363. The indicatnig bar 362 can be frictionally arrested relative to scale 363. Similarly the segment 352 with the scale 353 can be arrested relative to the indicating needle 354.

Upon scale 360 of segment 358 indicating markers 364, 365, 366, 367 are arranged, consisting of slidable riders which can be arrested by wing nuts. The scale 369 arranged at the base of the sliding carriage 344 corrects for differences in sizes of the individual eggs. Where smaller eggs are tested the carriage is moved further away from the egg and where larger eggs are tested the carriage is moved closer to these eggs. In this manner the distance covered by the indicating needle 347 in measuring the height of the yolk shadow above the center of the focus of the light source is increased or decreased respectively.

The device just described operates as follows:

A number of eggs, for instance 100 eggs of equal weight, are measured and the average value of the height of the yolk shadow is ascertained. Thereupon the wing nuts 348 and 356 are fastened. The value $x$ (distance of the greatest width from the center of the egg) for the particular egg is measured and the indicating needle 362 is arrested in the respective position relative to scale 363. In addition, the ratio of the greatest width to the greatest length of the egg is measured as described above and the segment 352 is arrested in the respective position relative to the indicating needle 354. Finally the indicating needle 347 is set to coincide with the mean value of the height of the yolk shadow. The corrected height of the yolk shadow is then indicated by the position of the indicating needle 350 on scale 360, for eggs of equal weight and volume. In that manner the relevant characteristics, as for instance, the sex characteristics, are indicated, as the scale 360 is subdivided into, for example, male and female ranges by marking devices 364 to 367, which can be adjusted on the scale so as to indicate more detailed and precise subdivisions of the characteristics desired.

It will be understood that this invention is susceptible to modification in order to adapt it to different usages and conditions, and, accordingly, it is desired to comprehend such modifications within this invention as may fall within the scope of the appended claims.

What we claim is:

1. A method of testing and sorting a collection of fresh, akin, bird's eggs for a latent biological feature, comprising the steps of measuring each egg to obtain four determinant factors, said factors consisting of (1) the height of the yolk shadow, this being a function of the size of the yolk and being measured at substantially constant hatching temperatures; (2) the volume of the entire egg; (3) the ratio of the greatest width to the length of the egg; and (4) the factor $x$ representing the distance between the center of the longitudinal axis and the crossing point of the axis of greatest width with the longitudinal axis; and then selecting those eggs of the collection for which said four factors lie within a coordinate range that is representative of said latent biological feature.

2. A method of testing and sorting a collection of fresh, akin, bird's eggs for a latent biological feature, comprising the steps of measuring each egg to obtain four determinant factors, said factors consisting of (1) the height of the yolk shadow, this being a function of the size of the yolk and being measured at substantially constant hatching temperature; (2) the weight of the entire egg; (3) the ratio of the greatest width to the length of the egg; and (4) the factor $x$ representing the distance between the center of the longitudinal axis and the crossing point of the axis of greatest width of the egg with the longitudinal axis; and then selecting those eggs of the collection for which said four factors lie within a coordinate range that is representative of said latent biological feature.

3. A method of sorting a collection of fresh, akin, biologically undamaged bird's eggs for a latent biological feature, to be developed by hatching, which comprises measuring each egg of a sample representative of said collection to obtain the length and the greatest width of the egg, hatching the eggs of said sample to allow them to develop said latent feature, measuring each egg of said collection to obtain the length and greatest width thereof, and then selecting those eggs of the collection for which said measurements lie within the coordinate range that was shown, by the hatching of the eggs of the sample, to be representative of said latent biological feature.

4. A method of sorting a collection of fresh, akin, biological undamaged bird's eggs for a latent biological feature, to be developed by hatching, which comprises measuring each egg of a sample representative of said collection to obtain (1) the ratio of the length to the greatest width of the egg, and (2) the factor $x$ representing the distance between the center of the longitudinal axis and the crossing point of the axis of greatest width of the egg with the longitudinal axis, hatching the eggs of said sample to allow them to develop said latent feature, measuring each egg of said collection to obtain the above specified measurements 1 and 2, and then selecting those eggs of the collection for which said measurements lie within the coordinate range that was shown, by the hatching of the eggs of the sample, to be representative of said latent biological feature.

5. A method of sorting a collection of fresh, akin, biologically undamaged bird's eggs for a latent biological feature, to be developed by hatching, which comprises measuring each egg of a sample representative of said collection to obtain (1) the height of the yolk shadow, this being a function of the size of the yolk and being measured at substantially constant hatching temperature; (2) the volume of the entire egg; (3) the ratio of the greatest width to the length of the egg; and (4) the factor $x$ representing the distance between the center of the longitudinal axis and the crossing point of the axis of greatest width with the longitudinal axis; then hatching the eggs of the sample to allow them to develop said latent feature, then measuring each egg of the collection to obtain the above specified measurements 1, 2, 3 and 4, and then selecting those eggs of the collection for which said measurements lie within the coordinate range that was shown, by the hatching of the eggs of the sample, to be representative of said latent biological feature.

References Cited in the file of this patent

UNITED STATES PATENTS

| | | |
|---|---|---|
| 1,307,775 | Hacker | June 24, 1919 |
| 1,832,901 | Harrison | Nov. 24, 1931 |
| 1,880,425 | Flanders | Oct. 4, 1932 |
| 2,186,196 | Haugh | Jan. 9, 1940 |
| 2,362,774 | Romanoff | Nov. 14, 1944 |
| 2,648,430 | Wilson | Aug. 11, 1953 |
| 2,727,391 | Kolisch | Dec. 30, 1955 |

UNITED STATES PATENT OFFICE
CERTIFICATE OF CORRECTION

Patent No. 3,087,614                      April 30, 1963

Wolfgang L. Abel et al.

It is hereby certified that error appears in the above numbered patent requiring correction and that the said Letters Patent should read as corrected below.

In the grant, lines 2 and 12, and in the heading to the printed specification, line 4, for "Ova Colombo Gesellschaft m.b.H." each occurrence, read -- Ovo Colombo Gesellschaft m.b.H. --.

Signed and sealed this 31st day of March 1964.

(SEAL)
Attest:

ERNEST W. SWIDER

Attesting Officer

EDWARD J. BRENNER

Commissioner of Patents